Dec. 6, 1932.     R. V. HEUSER     1,889,959
PROCESS FOR PRODUCING THIOUREA
Filed Feb. 9, 1931
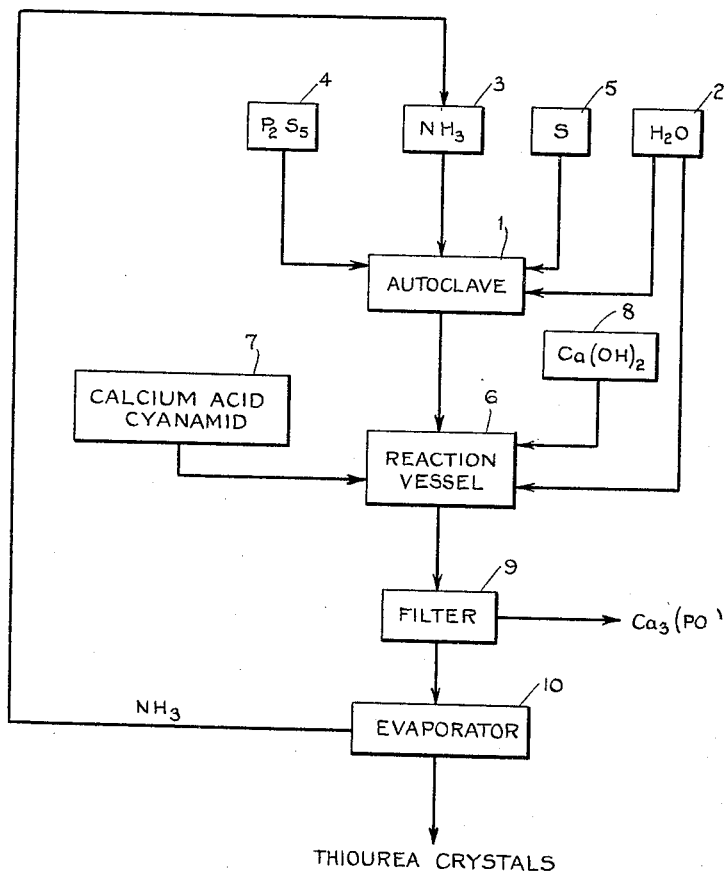
INVENTOR
R. V. Heuser
BY
ATTORNEY Patented Dec. 6, 1932

1,889,959

UNITED STATES PATENT OFFICE

RALPH V. HEUSER, OF CRANFORD, NEW JERSEY, ASSIGNOR TO AMERICAN CYANAMID COMPANY, OF NEW YORK, N. Y., A CORPORATION OF MAINE

PROCESS FOR PRODUCING THIOUREA

Application filed February 9, 1931. Serial No. 514,386.

This invention relates to the production of thiourea by a reaction involving phosphorous pentasulphide and a cyanamid.

In my co-pending application Serial #510,081, filed January 21, 1931, entitled "Method of making thiourea", I have described a highly useful and successful process for the production of thiourea of high purity on a large scale. By further experimenting I have determined that it is possible to make an equally pure thiourea by a new method which has substantially all of the advantages of the method described in my co-pending application.

I have found now that phosphorous pentasulphide can be employed advantageously in such a process, inasmuch as this reagent not only is suitable to yield hydrogen sulphide by hydrolysis but that it also supplies a phosphate anion for precipitating the calcium of the cynamid extract in the form of insoluble tricalcium phosphate. It is thus possible to avoid the necessity of first converting the calcium-hydrogen-cyanamid to free cyanamid by means of sulphuric acid or carbon dioxide. Therefore the reaction in the present instance takes place between calcium-hydrogen-cyanamid and a solution of a mixture of soluble sulphides and phosphates, derived from the phosphorous pentasulphide. Obviously the aim of separating the calcium as tricalcium phosphate can be realized only in neutral or alkaline solution and advantage can be taken of the fact that the hydrolysis of phosphorous pentasulphide proceeds more rapidly in the presence of ammonia or alkali hydroxides than without these bases. When phosphorous pentasulphide, in a pulverized condition, is added to a dilute, cooled solution of ammonia it passes into solution rapidly with formation of an addition product of variable composition. On steam-distilling or autoclaving the solution of the addition product it is converted into ammonium sulphide and di-ammonium phosphate.

Essentially quantitative conversions of the sulphur in phosphorous pentasulphide to soluble sulphide-sulphur are realized in this reaction. It is then only necessary to add to the solution of this mixture of inorganic salts the requisite amount of a filtered calcium cyanamid, extract or a slurry of suspended calcium cyanamid, preferably in conjunction with a small amount of elementary sulphur, in order that thiourea is formed in solution and calcium precipitated in an insoluble form. The excess of phosphoric acid present in the liquor in form of ammonium phosphate is removed by the addition of a small excess of milk of lime.

In practicing my invention I proceed for instance, in the following manner. 1 kg. of phosphorous pentasulphide of 84 per cent purity is added to a mixture of 4.06 kg. of aqueous ammonia of specific gravity 0.898 at 15° C. and 13 liters of water at a temperature of 15 to 20° C. The resulting solution is heated in an autoclave at 100 to 120° C. for approximately two hours. After cooling the resulting solution of ammonium sulphide and diammonium phosphate is then added to the filtered extract of calcium cyanamid. The quantity of the latter is computed from the reaction.

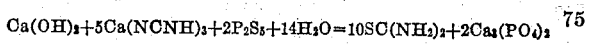

The mixture of the two solutions is agitated and some kieselguhr is added to facilitate the filter pressing of the gelatinous precipitate of tri-calcium phosphate as well as the requisite amount of milk of lime for completing the precipitation. When the reaction is completed as ascertained by the absence of cyanamid in the liquor the suspension is filtered and the filtrate is heated in a closed vessel for recovering the ammonia liberated in the reaction. The thiourea is separated finally in a crystalline form on cooling the concentrated liquor. The conversions based upon cyanamid-nitrogen and phosphorous pentasulphide-sulphur were found to be above 90 per cent of the theoretical values.

Although the final net reaction appears simple there are a number of intermediate reactions taking place and for clarity, an analysis thereof will be made. The first stage of the reaction is the addition of ammonia to phosphorous pentasulphide forming a complex compound, which in the presence of water and at a high temperature is converted into di-ammonium phosphate and ammonium sulphide. The reactions may be represented as follows:

$$P_2S_5 + 8H_2O = 2H_3PO_4 + 5H_2S$$

$$2H_3PO_4 + 4NH_3 = 2(NH_4)_2 + HPO_4$$

$$5H_2S + 10NH_3 = 5(NH_4)_2S$$

To the resulting product, which is a mixture of ammonium phosphate and ammonium sulphide, is added a cyanamid extract or calcium acid cyanamid, together with milk of lime causing the following reaction to take place:

$$Ca(OH)_2 + 4(NH_4)_2HPO_4 +$$
$$10(NH_4)_2S + 5Ca(HNCN)_2 =$$
$$10H_2NCSNH_2 + 28NH_3 +$$
$$2Ca_3(PO_4)_2 + 2H_2O$$

It will be noted that the sole reaction products are thiourea and insoluble calcium phosphate, which is filtered off. A large amount of ammonia is regenerated in this step and upon evaporation it is easily recovered for reuse.

In the accompanying drawing constituting a part hereof, the single figure is a flow sheet showing various steps in the operation of my process. Into the autoclave 1 is placed a sufficient amount of water 2, with ammonia 3, to form a weak solution of aqua ammonia and to this is added phosphorous pentasulphide 4 and a small amount of sulphur 5. The mixture is heated as mentioned previously and withdrawn after cooling into the reaction vessel 6. After adding thereto the calcium acid cyanamid solution 7, the mixture is agitated and sufficient milk of lime 8 is introduced to complete the precipitation of the phosphates at an elevated temperature for completing the reaction and improve the filtering qualities of the precipitate. The slurry is then filtered in the filter press 9 from which the thiourea liquors is conveyed to the evaporator 10 from which the ammonia released is recovered and re-introduced into the process. The concentrated liquor is run subsequently into the crystallizing pan 11 wherein the thiourea crystallizes out on cooling. If desired the evaporation need not be made to dryness, but to a sufficient extent so that upon cooling thiourea crystallizes out.

It will be noted that my process utilizes relatively cheap raw materials and theoretically it requires only phosphorous pentasulphide, calcium cyanamid and a little lime and sulphur. The thiourea is readily formed without the necessity of accurate control or close supervision by skilled chemists. The efficiency of the reaction is very high, it being feasible to recover 90 to 95 per cent of the theoretical quantity of thiourea and the product is of excellent quality.

Although I have described my invention, setting forth a specific embodiment thereof and specific conditions of operation and certain steps of procedure, it will be obvious to the skilled chemist that variations in the ingredients and steps are possible with good results. For example, in place of phosphorous pentasulphide I may use other sulphides of phosphorus, it being merely necessary that whatever sulphides are used they shall react to form the ammonium sulphide and phosphate. In place of ammonia other alkalies may be used, but I use ammonia for convenience because it may be readily separated from the thiourea, and because it is less likely to promote undesirable side reactions. In place of calcium acid cyanamid, I may use calcium or free cyanamid or other cyanamids such as may come into consideration.

In the claims where I have used the terms phosphorous pentasulphide, ammonia and cyanamid, I intend to include all the equivalents thereof. My invention is to be broadly construed except as limited by the claims appended hereto.

What I claim is:

1. A method of making thiourea which comprises causing a reaction between phosphorous pentasulphide and ammonia, adding a cyanamid thereto and recovering the thiourea formed.

2. A method of making thiourea which comprises causing a reaction between phosphorous pentasulphide and ammonia, adding a cyanamid solution thereto and recovering the thiourea formed.

3. A method of making thiourea which comprises causing a reaction between phosphorous pentasulphide and ammonia, adding a cyanamid capable of forming an insoluble phosphate thereto, and recovering the thiourea formed.

4. A method of making thiourea which comprises causing a reaction between phosphorous pentasulphide and ammonia, adding calcium acid cyanamid thereto, and recovering the thiourea formed.

5. A method of making thiourea which comprises causing a reaction between phosphorous pentasulphide and ammonia, adding calcium acid cyanamid solution thereto, and receovering the thiourea formed.

6. A method of making thiourea which comprises causing a reaction between phosphorous pentasulphide and ammonia, adding a cyanamid thereto, adding sufficient lime to precipitate the phosphorus as tri-calcium phosphate and recovering the thiourea formed.

7. A method of making thiourea which comprises causing a reaction between phosphorous pentasulphide and ammonia, adding a cyanamid thereto, adding sufficient lime to precipitate the phosphorus as tri-calcium phosphate, filtering off the phosphate and recovering the thiourea formed.

8. A method of making thiourea which comprises causing a reaction between phosphorous pentasulphide and ammonia, adding a cyanamid thereto, adding sufficient lime to precipitate the phosphorus as tri-calcium phosphate, filtering off the phosphate, heating the solution to drive off ammonia, and recovering the thiourea formed.

9. A method of making thiourea, which comprises causing a reaction between phosphorous pentasulphide and ammonia, adding a cyanamid thereto, adding sufficient lime to precipitate the phosphorus as tri-calcium phosphate. filtering off the phosphate, heating the solution to drive off ammonia, evaporating off water and causing thiourea to crystallize.

10. A method of making thiourea which comprises digesting phosphorous pentasulphide and ammonia in the presence of water, adding a cyanamid thereto, and recovering the thiourea formed.

11. A method of making thiourea which comprises digesting under heat and pressure phosphorous pentasulphide and ammonia in the presence of water, adding a cyanamid thereto, and recovering the thiourea formed.

12. A method of making thiourea which comprises digesting under heat and pressure phosphorous pentasulphide and ammonia in the presence of water, adding a cyanamid thereto, allowing the mixture to stand, and recovering the thiourea formed.

13. A method of making thiourea which comprises digesting under heat and pressure phosphorous pentasulphide and ammonia in the presence of water and free sulphur, adding a cyanamid thereto, and recovering the thiourea formed.

In testimony whereof, I have hereunto subscribed my name this fourth day of February 1931.

RALPH V. HEUSER.